United States Patent [19] [11] Patent Number: 4,818,911
Taguchi et al. [45] Date of Patent: Apr. 4, 1989

[54] STATOR OF ELECTRIC MOTOR

[75] Inventors: Norikazu Taguchi, Kakegawa; Hirozumi Nishizaki, Toyohashi; Hisashi Masui, Kosai; toshiyasu Ishizuka, Hamamatsu, all of Japan

[73] Assignee: ASMO Co., Ltd., Kosai, Japan

[21] Appl. No.: 105,986

[22] Filed: Oct. 7, 1987

Related U.S. Application Data

[63] Continuation of Ser. No. 836,486, Mar. 5, 1986, abandoned.

[30] Foreign Application Priority Data

| Mar. 9, 1985 [JP] | Japan | 60-46799 |
| Mar. 9, 1985 [JP] | Japan | 60-46800 |
| Mar. 11, 1985 [JP] | Japan | 60-34873[U] |
| Mar. 11, 1985 [JP] | Japan | 60-34874[U] |
| Mar. 11, 1985 [JP] | Japan | 60-34875[U] |

[51] Int. Cl.[4] ............................................. H02K 1/12
[52] U.S. Cl. .................................... 310/259; 310/41; 310/43; 310/90; 310/194; 310/218
[58] Field of Search ............... 310/216, 42, 43, 194, 310/179, 218, DIG 6, 90, 45, 49 R, 89, 41, 260, 40 MM, 180, 181, 162, 254, 259, 156, 162, 36, 39, 154, 258, 185, 261

[56] References Cited

U.S. PATENT DOCUMENTS

| 2,499,326 | 2/1950 | O'Brien | 310/420 UX |
| 3,027,475 | 3/1962 | Gaudry | 310/43 |
| 3,444,402 | 5/1969 | Cartier | 310/43 |
| 3,720,914 | 3/1973 | Hallerbach | 310/43 |
| 3,725,708 | 4/1973 | Possis | 310/DIG. 6 |
| 3,748,508 | 7/1973 | Wooley | 310/41 |
| 3,751,697 | 8/1973 | Morley | 310/41 |
| 3,780,323 | 12/1973 | Swain | 310/43 |
| 3,866,071 | 2/1975 | Hallerback | 310/218 X |
| 3,869,628 | 3/1975 | Koritsky | 310/179 |
| 3,912,955 | 10/1975 | Simpson | 310/216 X |
| 3,983,435 | 9/1976 | Sims | 310/216 X |
| 4,053,800 | 10/1977 | Hanning | 310/43 |
| 4,186,322 | 1/1980 | Besson | 310/194 |
| 4,209,719 | 6/1980 | Schädlich | 310/42 |

FOREIGN PATENT DOCUMENTS

| 1102267 | 3/1961 | Fed. Rep. of Germany | 310/41 |
| 1460560 | 10/1966 | France | 310/41 |

Primary Examiner—R. Skudy
Attorney, Agent, or Firm—Burns, Doane, Swecker & Mathis

[57] ABSTRACT

A stator of an electric motor provides pole retaining portions which retain the poles therein and are radially project at their end portions towards the outer periphery in a ring shape, whereby winding operations around the outer surface of the pole retaining portion are performed from the outside without any restriction, thus allowing a small-sized motor stator to be easily manufactured.

22 Claims, 6 Drawing Sheets

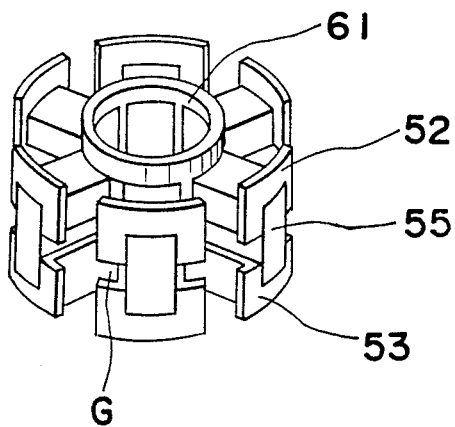
Fig. 10
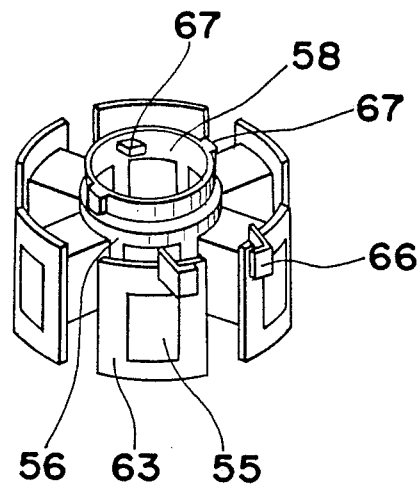
Fig. 11
Fig. 12
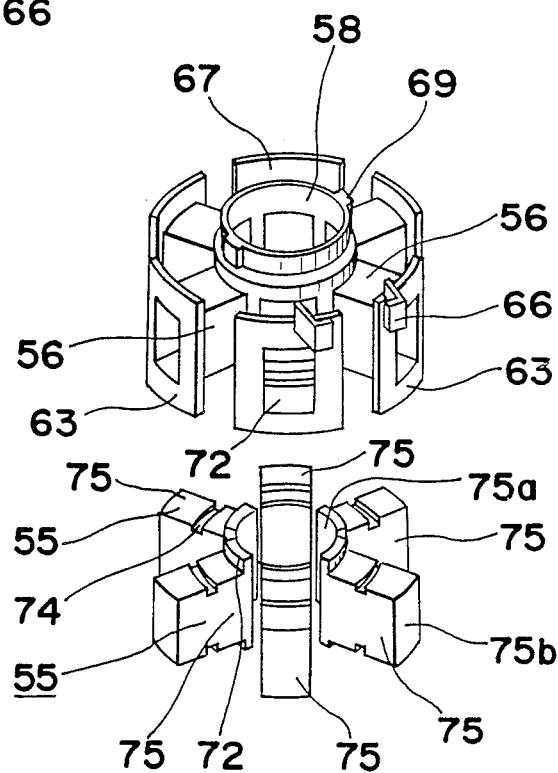

STATOR OF ELECTRIC MOTOR

This application is a continuation of application Ser. No. 836,486, filed Mar. 5, 1986 abandoned.

BACKGROUND OF THE INVENTION

The present invention relates to a stator of an electrical motor, and more particularly to improvements in the stator construction in an electrical motor composed of a rotor and a stator, which has a plurality of pole pieces arranged in radial shape on the outer periphery of the rotor and has windings of coils disposed on these pole pieces.

Conventionally, FIG. 13 shows one example of a stator having been employed in this type of electrical motor, in which a plurality of radial poles 1 project inwardly from the inner face of the casing of a yoke member 4. the Windings of coils 3 are provided on each pole 1 a layer of insulating material separates the windings 3 from the poles 1.

FIG. 14 shows another embodiment, wherein each pole 1 is separate from the casing of yoke member 4. The windings of coil 3 are provided on the layers of insulating material 2 on the individual poles 2. A convex portion 1a of the pole member 1 is fixedly inserted into the concave portion 4a of the yoke member 4.

In manufacture of the motor illustrated in FIG. 13, the winding operation has to be performed by the use of the clearance 5 among the respective poles 1, and the narrow space 5 on the inner face of the yoke member 4. Hence, the winding operation becomes difficult particularly with small-sized motors, thus resulting in extremely inferior operational property.

However, the construction shown in FIG. 14 is free from this problem, the winding operation may be performed on the poles prior to insertion in the yoke member 4 so that the operation is extremely easy to perform. In small-sized motors, however, the mounting operation on the yoke member 4 is difficult to perform because the pole piece 1 itself is small, thus resulting in extremely inferior operational property. Accordingly, the construction of FIG. 14 is not particularly suitable for the manufacture of small-sized motors.

SUMMARY OF THE INVENTION

The present invention is provided to solve such a problem as described hereinabove and to simplify the winding operation of coil on the pole pieces of stator unit.

To achieve the above-described task, according to one preferred embodiment of the present invention, the rotor is composed of a pair of insulator members with a plurality of pole retaining portions being projected in radial shape and disposed on the outer periphery of the ring-shaped portion, a plurality of poles which are respectively grasped by each pole retaining portion of the insulator members at given positions mutually independent to the other in radial shape, the winding of coils which are respectively applied upon each pole retaining portion to engage the yoke member with the outer periphery of the insulator member thereby to fixedly combine each pole with the yoke member integrally. Accordingly, since the pole retaining portions which retain the poles are radially provided in a ring shape, the pole retaining portions project at their end portions towards the outer wide space the winding operation becomes extremely easy to perform from the outside without any restriction, so that all the necessary thing is the engagement of the yoke member after the winding operation, thus allowing the small-sized motor stator to be easily manufactured.

In another preferred embodiment of the present invention, the rotor is composed of a molded insulator member with a plurality of pole retaining portions being projected in radial shape and disposed on the outer periphery of the ring-shaped portion, a plurality of poles which are embedded in each pole retaining portion of the insulator members to integrally form them at given positions mutually independent to the other, and windings of coils which are respectively applied upon each pole retaining portion to engage the yoke member with the outer periphery of the insulator member thereby to fixedly combine each pole with the yoke member integrally. It is to be noted that such usage as described hereinabove is one example, and the present invention may also be applied in a stator for a normal motor which continuously rotates in the same direction, a stepping motor or the like, various types of AC or DC motors.

BRIEF DESCRIPTION OF THE DRAWINGS

These and other objects and features of the present invention will become clear from the following description taken in conjunction with a preferred embodiment thereof with reference to the accompanying drawings, in which:

FIG. 10 is a perspective view illustrating another embodiment of the stator unit shown in FIG. 4;

FIGS. 10 through 12 are perspective views showing further embodiments of the stator unit shown in FIG. 4.

DETAILED DESCRIPTION OF THE PREFERRED EMBODIMENT

Figure 1:
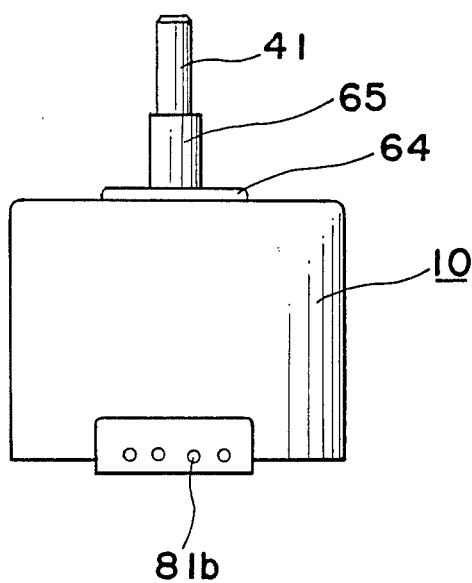
FIG. 1 is a front view of an electric motor according to the invention.

Before the description of the present invention proceeds, it is to be noted that like parts are designated by like reference numerals throughout the accompanying drawings.

FIGS. 1 to 9 show a motor, according to one preferred embodiment of the present invention, which comprises a stator unit 50 accommodated within a casing 10 having an end plate 20. The motor is provided with a cord-connection of a printed circuit board 30, and a rotor 40 is rotatably installed within a central cylindrical hollow 58 of the stator unit 50 upon the projecting end portion of a shaft 41 of the rotor 40 which extends from the casing 10.

The stator unit 50 includes a molded insulator 51, which is divided into upper and lower half shells 52, 53, a pole 54 arranged by a plurality of independent, individual pole pieces 55 each inserted into the respective trough 56 of the shells, and a plurality of coils 57 each wound around the individual trough 56 having the pole piece 55 therein. The stator unit 50 is inserted into and secured within the casing 10, and has the hollow 58 through which the rotor 40 is rotatably provided, the casing 10 being covered by the end plate 20. The printed circuit board 30 is mounted between the stator unit 50 and the end plate 20.

The casing 10 is formed as a yoke of cap type with a top plane 11 having a hole 12 at its center for passage of the shaft 41 of rotor 40, and a side cylindrical plane 13 at the lower edge of which provides a plurality of legs 14 for mounting the end plate 20 and a cut-out portion 15 for inserting a grommet 31 of the cord connection.

The molded insulator 51 is made of insulating materials and includes a rotor inserting portion having upper and lower 360° rings 61, 62 which provide the vertical hollow 58 for the stator and horizontal openings for the pole pieces, a pole mounting portion provided by a plurality of troughs 56 having closed-sections, a coil mounting portion having a plurality of flanges 63, a case mounting portion of bracket 64, a motor shaft receiving portion of boss 65, a grommet receiving portion having a pair of hooks 66 mounted on the flange 63 and an end-plate and printed circuit board mounting portion including outer projections 67 mounted on the lower ring 62. The hollow 58 of the rotor insertion portion which is provided at the center of the mold insulator 51 is covered at its top end by the bracket 64 provided with the boss 65. The troughs 56 extend radially outward from the upper and lower rings 61, 62 at the same circumference of a circle so as to form a multipetalous shape and have flanges 63 at their free ends, and at its bottom end with the projections 67 and hooks 66.

FIGS. 3 to 7 and 9 show the insulator 51 of six poles type, which is divided, for the purpose of facilitating the molding of insulator, at its middle into two parts, i.e., the upper half shell 52 including upper half troughs 56a, upper half flanges 63a, and the upper ring 61 with the bracket 64 and boss 65, and a lower half shell 53 including lower half troughs 56b, lower half flanges 63b, and the lower ring 62 with projections 67 and hooks 66. The upper half shell 52 is set on the lower half shell 53 to form one unit of the insulator 51 having the troughs 56 coupled with the upper half troughs 56a and the lower half troughs 56b, into each of which the pole piece 55 are inserted, while onto each of which the coil 57 is wound.

In the upper half shell 52, mounted on the upper end of the upper ring 61 is the bracket 64 having at its center of convex portion 68 on which the boss 65 is mounted. Six half troughs 56a are mounted on the lower end of the upper ring 61 to form a hexapetalous shape extending radially outward and downwardly at equal intervals from the upper ring 61 in all directions in the upright positions having an inverted U-shaped cross-section. Also, in the lower half shell 53, mounted on the upper end of the lower ring 62 are six half troughs 56b extending radially outward and upwardly at equal intervals from the lower ring 62 in all directions in the upright positions having a U-shaped cross-section to form a hexapetalous shape. Outer and inner projections 67, 69 are respectively mounted on the outer and inner surfaces of the lower end of the lower ring 62. Each of the upper and lower half flanges 63a, 63b is provided respectively on each of the free ends of the upper and lower troughs 56a, 56b, extending outwardly in stand-up position perpendicular to the respective trough 56 so as to form one unit of flange 63 coupled with the upper half flange 63a and lower half flange 63b. In addition, at the inner surfaces of the upper and lower rings 61, 62 disposed on the roots of the half troughs 56a, 56b there are provided a plurality of depressions 71 each receiving a rib 72 of the pole piece 55, and, also, at the middle portions of the inner bases of the half troughs there are provided protrusions 73 each for engaging with a notch 74 of the pole piece 55.

The pole pieces 55 are each formed in a similar configuration by molding. A parallelopiped body 75 has a front curved surface 75a to be faced with the outer surface of the rotor 40, a back curved surface 75b to be faced with the inner surface of the casing 10, and a pair of ribs 72 and notches 74 provided on the upper and lower planes of the body 75. The pole mounting portion for each pole piece 55 is formed by the trough 56 of insulator 51 assembled with the upper and lower half troughs 56a, 56b to provide a groove 77 therebetween into which the pole piece 55 is inserted through the horizontal opening of the rings 61, 62 so as to sandwich the pole piece 55 between the upper and lower half shells upon engaging the ribs 72 and notches 74 with the depressions 71 and protrusion 73 of the troughs 56.

Therefore, the stator unit 50 is assembled with upper and lower shells 52, 53 and six pole pieces 55 each inserted through the horizontal opening between the upper and lower rings 61, 62 into the grooves 77 of the stator unit 50. The rotor inserting portion is formed by the upper and lower rings 61, 62 and six pole pieces 55 to provide the hollow 58 thereamong to receive the rotor 40 therein, the hollow 58 being surrounded by the inner surfaces of rings 61, 62 and the front surfaces of the pole pieces 55. Also, the coil mounting portion for each coil 57 is formed by assembling the upper and lower shells and pole pieces to provide a ring space 78 surrounded by the outer surfaces of the trough 56, flanges 63 and rings 61, 62 to wind the coil 57 therearound. Accordingly, the stator unit 50 is obtained by winding the coils 57 within the ring space 78 around the troughs of insulator 51 assembled with the upper and lower half shells 52, 53 sandwiching the pole pieces 55 therebetween, the end terminals of the coils 57 being connected through wires 81a with circuits 82 provided on the printed circuit board 30.

The six pole pieces 55 inserted in the pole mounting portion of insulator 51 are retained mutually independent of each other at the right positions of grooves 77 to provide the hollow 58 at their center in the state of being sandwiched and grasped between the couple of the upper and lower half shells 52, 53 upon exposing its front and back surfaces to the outside under establishing the engagement of the ribs 72 and notches 74 of the pole pieces with the depressions 71 and protrusions 73 of the troughs 56 in order to fix the pole pieces 55 within the troughs 56 so as to form one unit for preventing withdrawal of insulator 51 from the pole mounting portion. Also, the coils 57 wound within the coil mounting portion of insulator 51 are fixedly placed at the right positions of ring spaces 78 surrounded by the rings 61, 62, troughs 56 and flanges 63 of insulator 51 constituting a kind of bobbins in order to prevent the coils 57 from being drawn out from the coil mounting portions of insulator 51 by means of the rings 61, 62 and flanges 63 in the state of being insulated against the pole pieces 55 by the insulators 51, and being mutually independent with each other to connect the circuits 82 of the printed circuit board 30. Since the troughs 56 of insulator 51 having the flanges 63 at their free ends extend radially outward from the rings 61, 62 to provide the ring spaces 78 to be separated from each other to the outside of the rings 61, 62 in the shape of multipetal, the work operation of winding the coils within the coil mounting portion of insulator 51 onto each of troughs 56 is easily performed without causing any trouble related to space restrictions typically encountered with a normal coil winding machine in a conventional manner.

Figure 4:
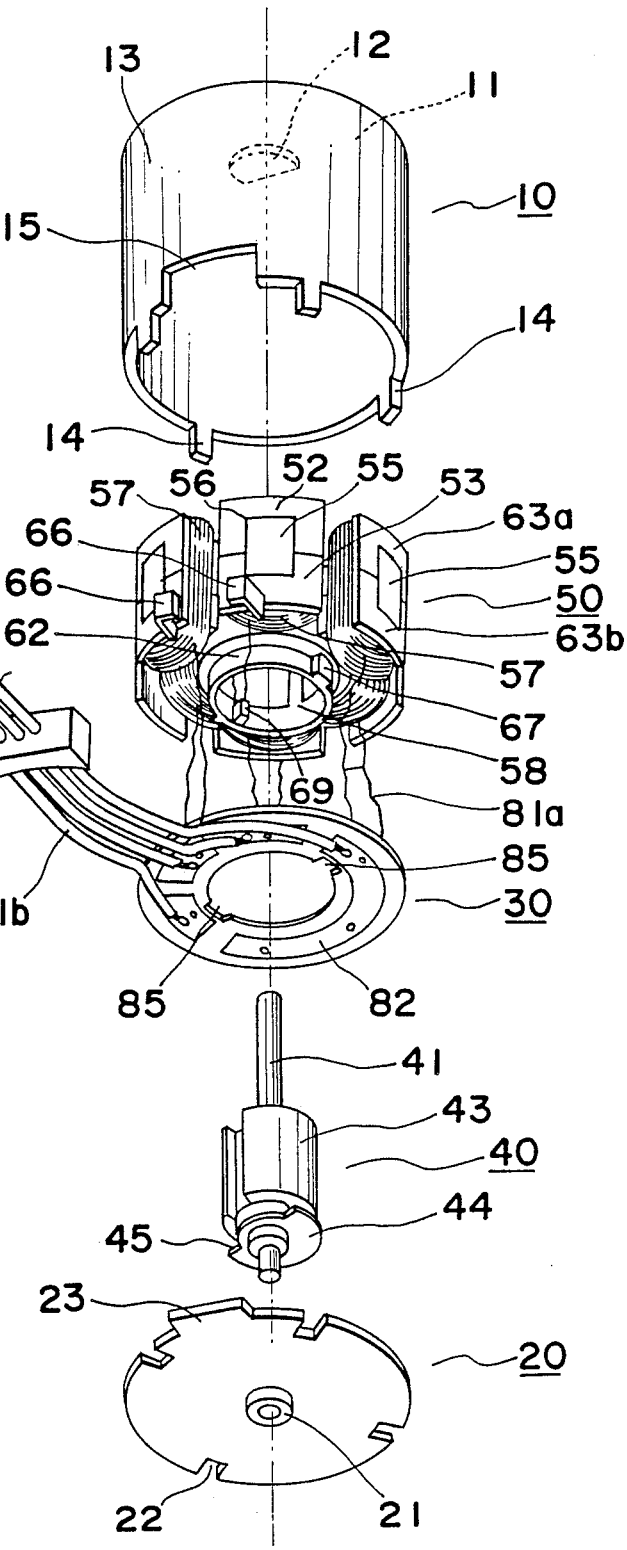
FIG. 4 is an exploded perspective view showing all components to be assembled into the one motor of FIG. 1.
Figure 5:
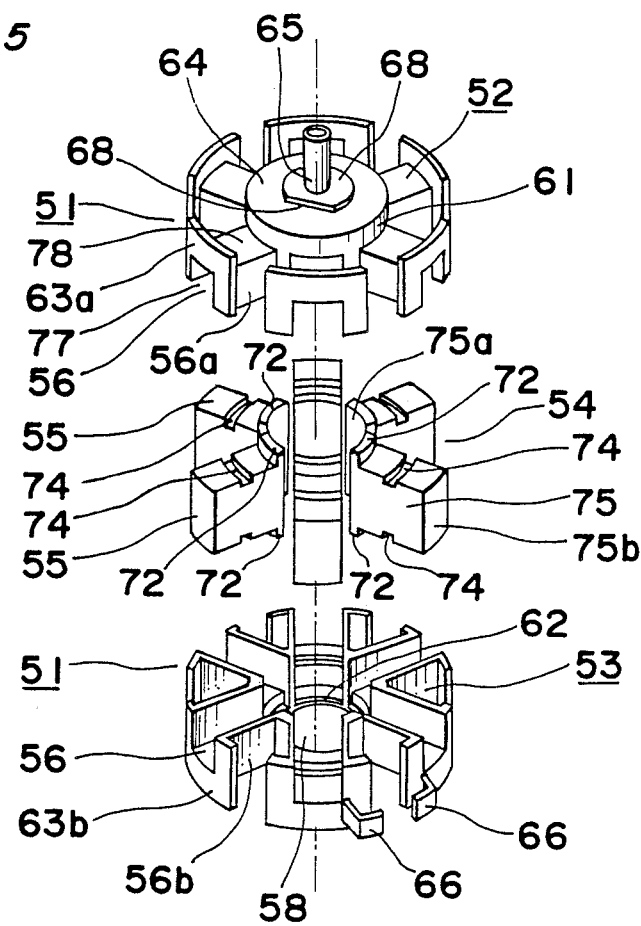
FIG. 5 is an exploded perspective view of a stator unit shown in FIG. 4.
Figure 6:
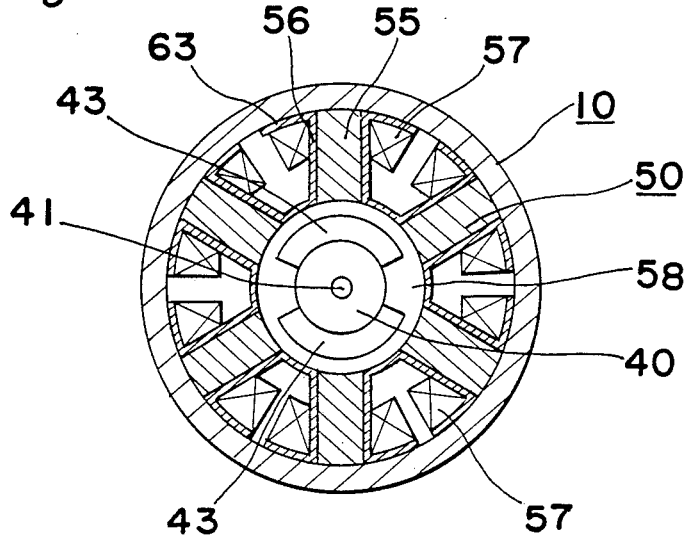
FIG. 6 is a cross-sectional view, cut along a line of horizontal, of the motor of FIG. 3.
Figure 7:
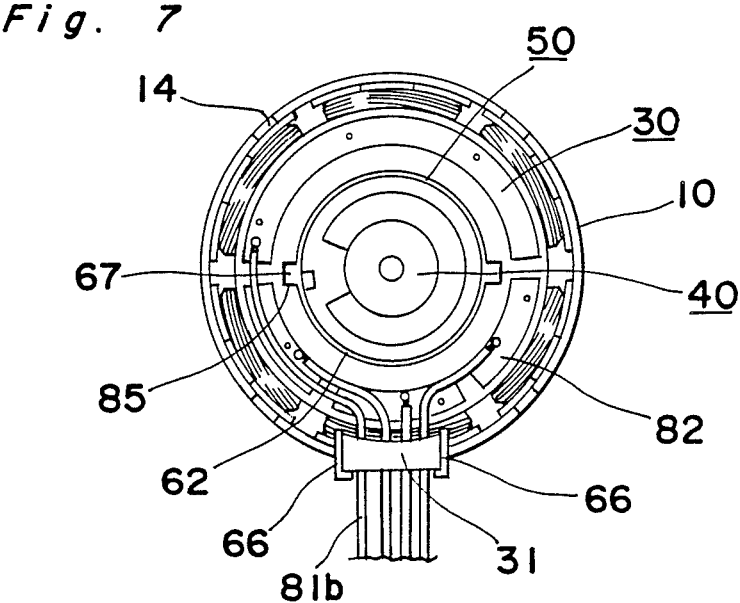
FIG. 7 is a bottom view of the motor of FIG. 1 with the endplate removed.
Figure 8:
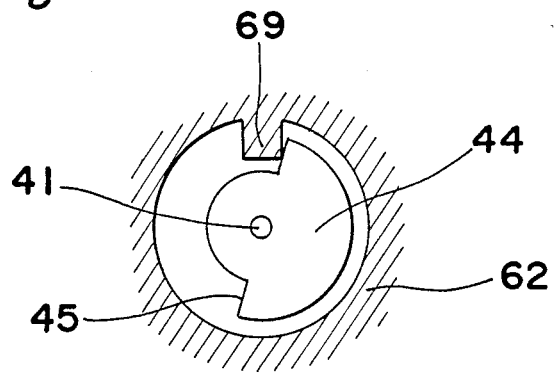
FIG. 8 is a partial view, on an enlarged scale, showing a stopper plate employed in the motor of FIG. 1.
Figure 9:
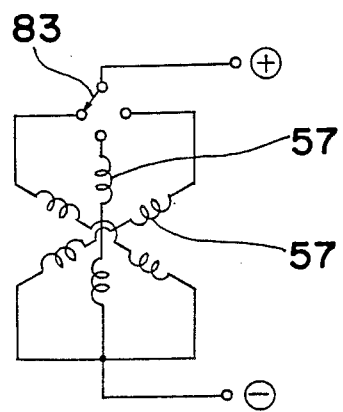
FIG. 9 is an electrical circuit of coils employed in the motor of FIG. 1.
Figure 13:
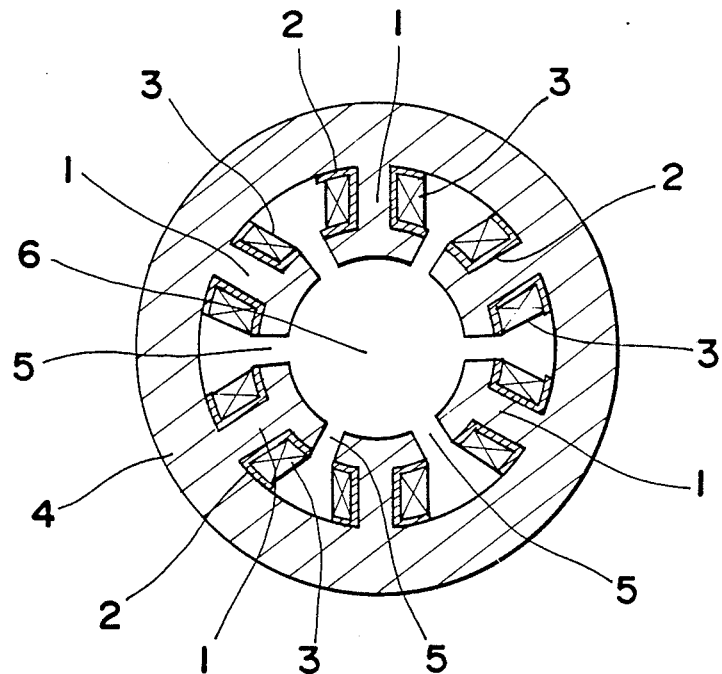
FIGS. 13 and 14 are cross-sectional views showing the conventional motors.
Figure 14:
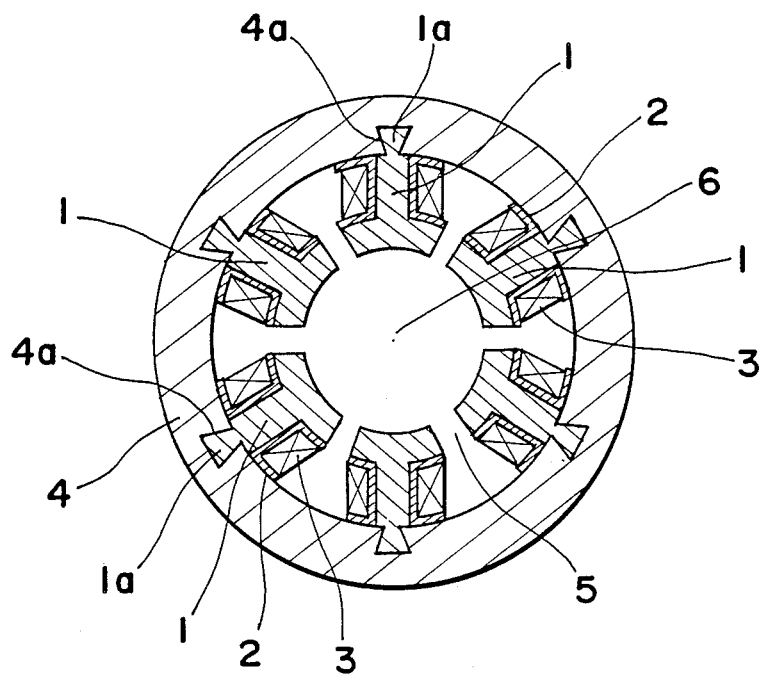

The printed circuit board 30 is provided as a junction plate of a cord connection which is adapted to connect the coils 57 of the stator unit 50 to an electric power source such as a battery, as shown in FIG. 9. A pair of coils 57 which oppose each other on an axial line of troughs 56 are connected in series together, one end of the series connection being connected to the power source while the other end of the series connection is connected to a switch 83 provided at the outside of the motor. The switch 83 may be positioned to select any one of the pair connected in series from the coils 57. The printed circuit board 30 is formed of a ring plate providing the circuits 82 connected with the coils at its upper surface and, at its lower surface, the other circuits 82 connected with a plurality of cords 81b drawn out through the grommet 31 to be connected with the power source and switch 83. The printed circuit board 30 has an inner diameter slightly larger than a ring formed by the ribs 72 of lower half shell 53 and an outer diameter slightly smaller than an ideal inner diameter of the lower half flanges 63b of lower half shell 53 so that the printed circuit board 30 is put into and mounted within a space disposed between the lower ring 62 and lower half flanges 63b of lower half shell 53 under engaging the outer projections 67 of lower half sheet 63b into recessions 85 provided at the inner side of the printed circuit board 30 in order to prevent it from rotating around the lower half shell. In FIG. 4, four cords 81b are draw out from the printed circuit board 30 to the outside through the grommet 31 to be fitted into and engaged with the pair of hooks 66 of the lower half shell in order to retain the printed circuit board 30 within the casing 10. When the stator unit 50 with the printed circuit board 30 is accommodated within the casing 10, the pair of hooks 66 retaining the grommet 31 therein is fitted into the cut-out portion 15 of the casing 10 upon drawing out the four cords 81b through the hooks 66 to the outside of casing 10.

The rotor 40 includes a shaft 41 which extends to the outside of casing 10 for connecting with a mechanical member to be driven by the shaft 41, a core 42 of plastic materials fixedly mounted on a middle portion of the shaft 41, a pair of permanent magnets 43 fixedly mounted on the core 42 by a bonding agent, and a stopper plate 44 fixedly mounted on a lower portion of the shaft 41. After the rotor 40 is rotatably inserted into the stator unit 50 which is inserted into the casing 10 and covered by the end plate 20, both ends of the shaft 41 are fitted into and rotatably journalled by the bosses 65, 21 of stator unit 50 and an end plate 20. The rotor 40 is formed as type of two poles on the employment of two magnets 43, so that it can be operated to rotate stepwisely by each of substantial 60 degrees at every actuation of one pair of coils 57 through the switch 83. However, the range of rotation of the rotor 40 is restricted by the engagement of a notch 45 provided on the outer periphery of the stopper plate 44 to the inner projection 69 of the lower half shell 53 so as to stop the rotor 40 at the given position. The stopper plate 44 is provided adjacent to the core 42 on the shaft 41 in corresponding to the inner projection 69 of the lower half shell 53 without further extending the length of the shaft 41 for mounting the stopper plate 44. The end plate 20 has the boss 21 formed as a journal or bearing for receiving the shaft 41 therein at its center portion, a plurality of cut-out portions 22 for receiving the legs 14 of the casing 10 therethrough, and a projected portion 23 for covering the underside opening of the space disposed between the hooks 66 of the lower half shell 53 to be inserted the grommet 31 therein.

With the above components, the motor is assembled by steps of, in the order, preparing the stator unit 50 upon winding the coils 57 around the troughs 56 of the the insulator 51 radially extended from the rings 61, 62 and accommodating the poles 55 within the grooves of the troughs 56 coupled with the upper and lower half shells 52, 53; inserting the printed circuit board 30 into the lower half shell 53 with the grommet 31 of the cords 81 being inserted between the hooks 66 of the lower half shell 53; inserting the stator unit 50 with the printed circuit board 30 into the casing 10 upon engaging the bracket 68 of the upper half shell 52 into the hole 12 of the casing 10, and fitting the hooks 66 of the lowr half shell 55 into the cut-out portion 15 of the casing 10; inserting the rotor 30 into the stator unit 50 upon journalling the shaft 41 into the boss 65 of the upper half shell 52; fitting the end plate 20 onto the casing 10 upon inserting the legs 14 of the casing 10 into the cut-out portions 22 of the end plate 20 and journalling the end of the shaft 41 onto the boss 21; and caulking the end of legs 14 disposed from the cut-out portions 22 to the outside to fix the end plate 20 onto the casing 10 in such a manner that the stator unit 50 is fixed between the casing 10 and the end plate 20, the grommet 31 of the printed circuit board 30 is retained within the hooks 66 of the lower half shell 53 covered by the projected portion of the end plate 20, and the shaft 41 of the rotor 40 is journalled at its both ends into the bosses 65, 21 of the stator unit 50 and end plate 20 while the rotor 40 is rotatably accommodated within the hollow 58 of the stator unit 50. Also, the stator unit 50 is fixedly mounted within the casing 10 by the engagement of the bracket 64 with the hole 12 of the casing 10 in a given position to prevent from rotating against the casing, since both the bracket 64 and hole 12 are formed of shaped eccentric to the axis of the shaft such as configurations of the convex portion 68.

In addition, the stator unit 50 is accommodated within the casing 10 with maintaining the inner and outer shapes of perfect circles in the cross-sections which comprise the inner surfaces of the rings 61, 62 and poles 55 and the outer surface of the flanges 63 and poles 55, respectively, so that the rotor 40 is inserted within the hollow 58 of the stator unit 50 with a gap of constant dimensions between the inner surfaces of the rings 61, 62 and poles 55 and the outer surfaces of the magents 43 of the rotor 40. The stator unit 50 is fixed within the casing 10 under close contact of constant pressure between the outer surfaces of the flanges 63 and poles 55 and the inner surfaces of the casing 10. The end plate 20 is fixed onto the casing 10 through the legs 14 of casing 10 which are fixed within the cut-out portions 22 of the end plate 20 by means of caulking the legs 14 of casing 10 toward the end plate 20, so that the casing 10, stator unit 50 and end plate 40 are fixed with each other under close contact of constant pressure among them along an axial direction of the rotor 40.

With the above assembly steps, there is provided a motor of construction with advantages such that the whole structure is small in dimension, precise and simple in arrangement, cheap and easy in production, easpecially in winding of coils onto the insulator which comprises the upper and lower half shells 52, 53 having half troughs 56a, 56b with flanges 63a, 63b coupled to the counterparts sandwiching the poles 55 therebetween to form troughs 56 extending radially outward from the rings 61, 62 so as to form a multipetalous shape of bobbins onto which the coils 57 are wound respectively with partition of flanges 63. Also, since the poles 55 and the coils 57 are completely insulated with each other by the insulator 51 of troughs 56, it is not necessary to provide a conventional, special material of insulation such as an insulate sheet or a special bobbin between the pole and coils.

In the modification of the stator unit 50, even when the upper and lower half shells 52, 53 are assembled to form troughs 56 of insulator 51 sandwiching the poles 55 with a gap G between the shells 52, 53, as shown in FIG. 10, sufficient insulation can be obtained between the poles 55 and coils 57 to be wound on the troughs 56 due to coverage of the corners of the poles 55 by the troughs 56 of insulator 51. Also, the shells 52, 53 can be formed to divide into shells along a line disposed at any position to be faced with the side elevational planes of the poles 55. On the employment of shells 52, 53 to be formed of various configurations in modification of the stator unit 50, the poles 55 are sandwiched between the troughs 56 of shells 52, 53 and the coils 57 are wound onto the troughs 57 of shells 52, 53 upon the insulation of the coils 57 against the poles 55 by the troughs 56 of shells 52, 53. Furthermore, the winding operation for each of the coils 57 can be easily done upon guiding a wire of coil from the outside onto one of troughs 56 of the insulator 51 independently to the neighbor troughs 56 of insulator 51 extending in another radial direction from the ring.

Figure 2:
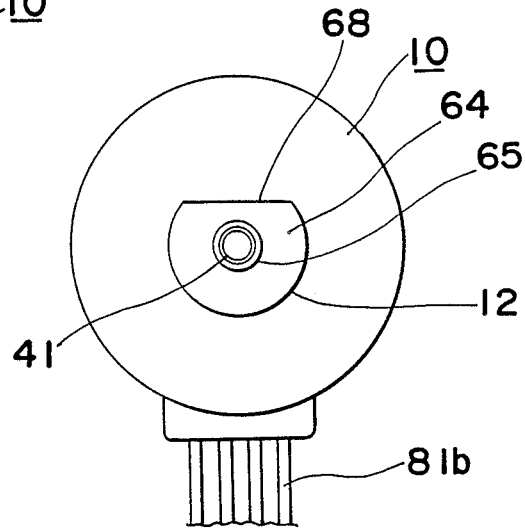
FIG. 2 is a top plan view of the motor of FIG. 1.
Figure 3:
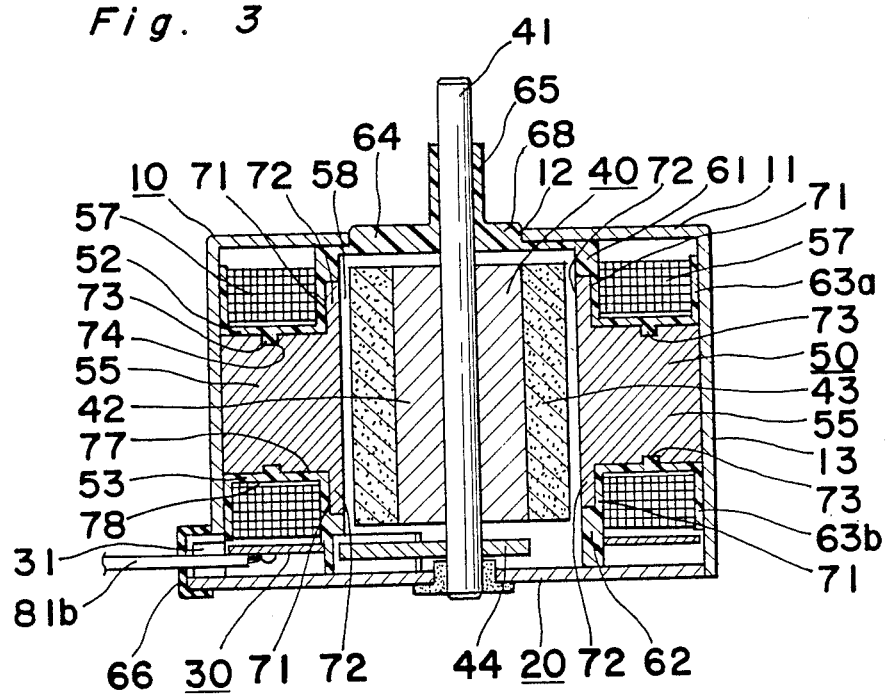
FIG. 3 is a cross-sectional view, of an enlarged scale, of the motor of FIG. 1.

In a further modification of the stator unit, the insulator 51 and pole 54 may be directly formed as one unit by means of integral molding, having a final construction similar to the one of FIG. 2, as shown in FIGS. 11 and 12. The insulating material such as resin is applied within a mold at one time to form one unit of insulator into which the pole pieces 55 are embedded integrally one by one. Within the mold, the six pole pieces 55 are firstly disposed at given positions of equal intervals in the radial direction in a form mutually independent with each other to form a hexapetalous shape, each of the pole pieces being constructed of the same configuration as the pole pieces of FIG. 5, providing the parllelopiped body 75, a pair of ribs 72, and a pair of notches 74. The insulator 51 is molded with the pole pieces 55, providing the rotor inserting portion of hollow 58, pole mounting portion of troughs 56, coil mounting portion of flanges 63, case mounting portion of bracket 64, motor shaft receiving portion of boss 65, grommet receiving portion of hooks 66, and end-plate and printed circuit board mounting portion of projections 67, 69. The insulator 51 is assembled with the casing 10, rotor 40 and end plate 20 in the same manner as the insulator of FIG. 2.

According to the present invention, pole pieces are grasped by a pair of insulator members and are disposed in the radial direction so that the winding operation of coils is easily performed from the outside without any restriction, thus simplifying the manufacturing operation of a small-sized, precise motor. Also, as a magnetic circuit of the rotor is formed by the engagement of the casing formed as a yoke member with the outer periphery of an insulator member integrated with the pole pieces after the completion of the winding operation, the assembling operation of the stator unit is simplified and insulation between the pole pieces and the winding coils may be provided by the pole pieces retaining portion of the insulator member, so that the conventional insulating seat and the bobbin becomes unnecessary, with the result that the assembling operation becomes simplified and the cost of manufacturing may be lowered.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An electric motor, comprising:
   a rotor; and
   a stator including an insulator member having an upper half shell and a lower half shell, each of said upper and lower half shells including a ring based portion and a pole retaining portion, said pole retaining portion having a plurality of troughs, said troughs extending radially outward from the outer periphery of the ring-based portion in a multipetalous shape, the troughs of said upper shell adapted to align with the troughs of said lower shell; a like plurality of substantially parallelepiped stator poles retained in respective pole retaining portions of the insulator member, each of said stator poles being sandwiched within respective troughs of said upper and lower shells; a plurality of windings, each of said windings applied around a respective stator pole retained in the respective pole retaining portion; and a yoke member which covers the outer periphery of the insulator member to integrally combine each pole with the yoke member.

2. The motor as defined in claim 1, further comprising a fixed projection provided on the inner periphery of one end face of the ring-based portion of the insulator member, and a projection disposed on the rotor to be engaged with the fixed projection.

3. The motor as defined in claim 1, further comprising a bearing for retaining the shaft of the rotor on one end face of the ring-based portion of the insulator member.

4. The motor as defined in claim 1, further comprising a junction-plate engagement portion provided on one end face of the insulator member and a junction plate connected with wires of the windings and having an engagement portion to be engaged with said junction-plate engagement portion to secure the junction plate to the insulator member.

5. The motor as defined in claim 4, wherein said junction-plate engagement portion of the insulator member is a cylindrical projected portion extended from the ring-based portion, the engagement portion of the junction plate is a circular hole, and a positioning convex portion is formed in one of the above portions, a positioning concave portion is formed in the other.

6. The motor as defined in claim 4, further comprising a grommet inserting portion formed in the pole retaining portion of the insulator member to retain a grommet mounted wires thereon.

7. The electric motor of claim 1, wherein each of said ring based portions extend for 360° about a central hollow of the stator and includes means for supporting said pole retaining portions.

8. The electric motor of claim 7, wherein said troughs of the pole retaining portions are cantileverly supported by the ring based portions.

9. The electric motor of claim 2, wherein the fixed projection of the insulator member and the projection disposed on the rotor are arranged so as to limit the rotation of the rotor in both directions.

10. An electrical motor, comprising:
a rotor; and
a stator including a plurality of independent stator poles arranged in equally spaced radial directions around the outer periphery of the rotor and a winding applied on each of said poles, the stator further including a pair of insulator members having an upper half shell and a lower half shell, each of said upper and lower half shells including a ring based portion and a pole retaining portion having a plurality of troughs for accommodating the stator poles, said troughs extending radially outward from the outer periphery of the ring-based portions in a multipetalous shape, the troughs of said upper shell adapted to align with the troughs of said lower shell, each of said stator poles being retained by a respective pole retaining portion of the pair of insulator members, said poles being sandwiched within respective troughs of said upper and lower shells; each of said windings applied around a respective stator pole retained within the respective pole retaining portion; and a yoke member which covers the outer periphery of the insulator members to combine integrally with the respective poles.

11. The electrical motor of claim 10, wherein each of said stator poles is substantially perallelopiped.

12. The electrical motor of claim 10, wherein each of said ring based portions extend for 360° about a central hollow of the stator and includes means for supporting said pole retaining portions.

13. The electric motor of claim 12, wherein said troughs are cantileverly supported by the ring based portions.

14. An electrical motor, comprising:
a rotor; and
a stator including an insulator member having an upper half shell and a lower half shell, each of said upper and lower half shells including a ring based portion and a pole retaining portion having a plurality of troughs for accommodating stator poles, said troughs extending radially outward from the outer periphery of the ring-based portion to form a multipetalous shape, the troughs of said upper half shell adapted to align with the troughs of said lower half shell; a plurality of individual stator poles being integrally embedded within a respective pole retaining portion of the insulator member so as to form a radially outwardly projecting support, said poles being arranged mutually independently in the radial directions; a plurality of windings each applied around the respective radially outwardly projecting supports; and a yoke member which covers the outer periphery of the insulator members to combine integrally with the respective pole.

15. The electrical motor of claim 14, wherein each of said stator poles is substantially parallelopiped.

16. The electrical motor of claim 14, wherein each of said ring based portions extends for 360° about a central hollow of the stator and includes means for supporting said troughs.

17. The electrical motor of claim 16, wherein said troughs are cantileverly supported by the ring based portions.

18. An electric motor comprising, in combination, a rotor and a stator including a plurality of stator poles arranged in the radial directions around the outer periphery of the rotor and windings applied on said poles, the stator further including an insulator member having a ring based portion and a plurality of pole retaining portions, each pole retaining portion projecting radially outward from the outer periphery of the ring-based portion, a fixed projection being provided on the inner periphery of one end face of the ring-based portion of the insulator member, each of said stator an insulator member having an upper half shell and a lower half shell, each of said upper and lower half shells including a ring based portion and a pole retaining portion having a plurality of troughs for accommodating stator poles, said troughs extending radially outward from the outer periphery of the ring-based portion to form a multipetalous shape, the troughs of said upper half shell adapted to align with the troughs of said lower half shell; a plurality of individual stator poles being integrally embedded within a respective pole retaining portion of the insulator member so as to form a radially outwardly projecting support, said poles being arranged mutually independently in the radial directions; a plurality of windings each applied around the respective radially outwardly projecting supports; and a yoke member which covers the outer periphery of the insulator members to combine integrally with the respective pole.

19. The electric motor of claim 18, wherein each of said stator poles is substantially parallelopiped.

20. The electric motor of claim 18, wherein said ring based portion extends for 360° about a central hollow of the stator and includes means for supporting said troughs.

21. The electric motor of claim 20, wherein said troughs are cantileverly supported by the ring based portion.

22. The electric motor of claim 18, wherein the fixed projection of the insulator member and the projection disposed on the rotor are arranged so as to restrict the rotation of the rotor in both directions.

* * * * *